May 15, 1923.
J. A. LEWIN ET AL
LIQUID DISPENSING APPARATUS
Filed April 24, 1920
1,455,593
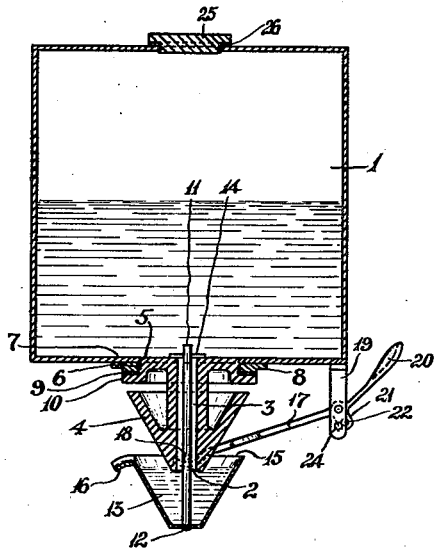
Fig. 1.
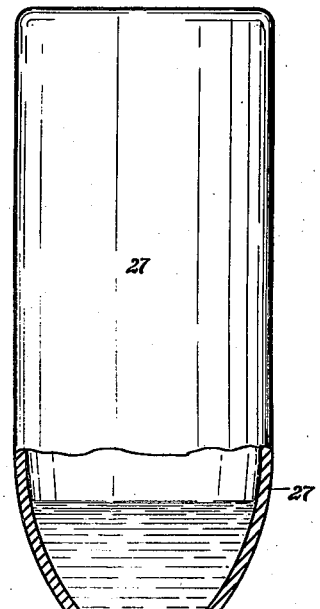
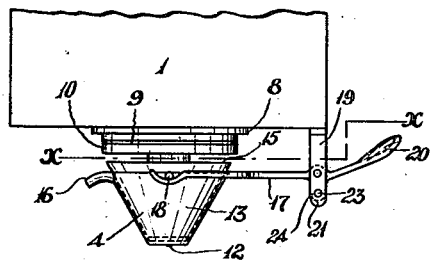
Fig. 2.
Fig. 4.
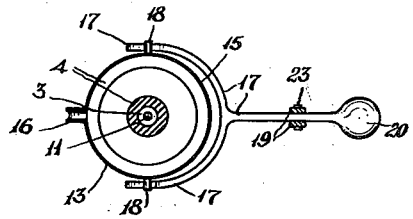
Fig. 3.
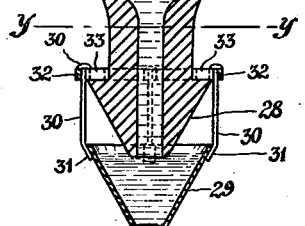
Fig. 5.
Witness:
Arthur Thompson
Inventors:
Joshua Aaron Lewin
George Pilcher Bartlett Patented May 15, 1923.

1,455,593

UNITED STATES PATENT OFFICE.

JOSHUA AARON LEWIN AND GEORGE PILCHER BARTLETT, OF DURBAN, NATAL, SOUTH AFRICA.

LIQUID-DISPENSING APPARATUS.

Application filed April 24, 1920. Serial No. 376,370.

*To all whom it may concern:*

Be it known that we, JOSHUA AARON LEWIN, a subject of the King of Great Britain, and GEORGE PILCHER BARTLETT, a subject of the King of Great Britain, both residents of Durban, Natal Province, Union of South Africa, have invented certain new and useful Improvements in Liquid-Dispensing Apparatus, of which the following is a specification.

The present invention consists of improvements in means applicable for use in withdrawing liquids, more particularly thin liquids, such as water, oil, et cetera, intermittently, from a vessel or container in a fixed or regulated predetermined quantity.

It consists principally of a vessel or container, which is air-tight except at a point at which the liquid discharge aperture is placed, and a receptacle or cup which is positioned or suspended around and beneath the outlet orifice of the vessel or container, at such a distance therefrom that the upper edge or rim of the cup or receptacle or its discharge spout, when in its lowermost position, is above the outlet orifice of the container or vessel.

The liquid in the cup or receptacle, when at the desired level, thus forms a seal or check to any further liquid being withdrawn or escaping from the vessel or container, until the cup or receptacle has had sufficient liquid removed from it to allow of air again entering the container through the discharge aperture and permitting of a further flow. Means are also provided for raising or lifting the cup or receptacle in order to empty or discharge the contents thereof.

The objects of our invention are to provide a seal or check which will obviate the necessity for providing valves or other devices having close-fitting ground seats or joints to prevent leakage, and one that will measure or regulate the quantity withdrawn from the container at each operation.

The invention will be especially useful when applied for use in flushing operations, or when it is desired to withdraw and deliver a fixed quantity of any liquid. It can also be adapted for use with a bottle or like receptacle for withdrawing the contents of the same intermittently, in a measured quantity.

The invention will be further described with the aid of the accompanying sheet of drawings in which—

Fig. 1 is a sectional elevation showing the invention applied to a tank or the like.

Fig. 2 is an elevation of a part of the arrangement shown in Fig. 1.

Fig. 3 is a sectional plan of Fig. 2 on line $x$—$x$.

Fig. 4 is a part sectional elevation showing the invention applied to a bottle.

Fig. 5 is a sectional plan of Fig. 4 on line $y$—$y$.

In putting our invention into practice in the form shown in Figs. 1 to 3, we provide a suitable container 1 of any desired shape. This container must be made air-tight at all points except the outlet aperture or orifice 2, which is provided at or near the bottom or underside of the container 1. The outlet orifice or aperture 2 is provided at the end of a passage 3 formed centrally of an inverted cone-shaped member 4 which at its upper end 5 is externally screw-threaded and fits an internal thread 6, formed as shown, in the bottom 7 of the container, and in a piece 8 attached thereto. Suitable packing 9 is placed between a flange 10 formed on the member 4 and the piece 8 in which the upper end 5 of the member 4 is screwed.

A rod or spindle 11, of considerably less diameter than the diameter of the passage 3 through the inverted cone-shaped member 4, passes up through said passage and at its lower end 12, has attached to it the cup or receptacle 13, which in this case, would be of inverted cone shape internally so as neatly to fit over the inverted cone-shaped member 4. A pin or stop 14 passes through or is attached to the rod or spindle 11 at its upper end, inside the container 1, and, by engaging the bottom 7 of the container 1, or the top or upper end 5 of the inverted cone-shaped member 4, serves to limit the movement in a downward direction, of the cup or receptacle 13.

The rim or upper edge 15 of the cup or receptacle 13, when in its lowermost position, is maintained at some distance above the outlet orifice 2 of the container 1, and when sufficient of the liquid has flowed into said cup or receptacle 13 to raise the level therein to that of the outlet orifice 2, the flow is checked owing to the fact that no more air can find its way into the container 1 because of the liquid seal, and any further tendency for the liquid to flow tends to cause a partial vacuum in the container 1.

To empty the cup or receptacle 13 it may be lifted up to the inverted cone-shaped member 4 (or the latter may be lowered into the cup), upon which the liquid contained in said cup flows down a spout 16 provided on the cup or receptacle or, if said spout be not provided, over the rim or top 15 of the cup or receptacle 13. Upon lowering the cup 13, the liquid at once begins to flow from the container 1 into said cup 13, owing to the ingress of air through the passage 3, into the container 1, and said flow continues until the level of the liquid reaches the point where it seals the container 1 by stopping the ingress of air.

The amount of lift of the cup or receptacle 13 may, if desired, be made adjustable by arranging the pin or stop 14 so that it may be placed in different positions on the spindle 11, or the means may be in any other suitable form.

Means will ordinarily be provided in this form of the invention, for lifting the cup or receptacle 13, in order to empty it and said means may, as shown, comprise a forked lever 17 which engages the pins 18 oppositely disposed on the cup or receptacle. Said lever is suitably fulcrumed, in a bifurcated bracket 19, and at its other end 20 is preferably shaped as shown, to be directly hand-actuated. If preferred it may be actuated through the medium of a rope or chain.

The lever 17 is as shown provided with an extension 21 which serves for securing said lever in the position in which it is placed when the cup is lifted. The extension 21 has a hole 22 formed in it—see Fig. 1—through which passes a pin 23 which also passes through a hole 24 in the bifurcated bracket 19 and so serves to lock the lever in the desired position, which would be useful while refilling.

A plug or cover 25 is screwed into or otherwise fixed to the top of the container 1, through which said container 1 could be filled at intervals. This plug or cover is of course, so screwed into the container 1 as to be perfectly air-tight, 26 being a packing ring to ensure this.

The cup or receptacle 13 and/or the inverted cone-shaped member 4 may be made of any suitable material such as metal, rubber, glass or earthenware.

In Figs. 4 and 5 the invention is shown applied to a bottle or the like 27. The bottle 27 is preferably cone-shaped around the end of the neck as indicated at 28. As in the previously described construction the cup or receptacle 29 is suspended beneath the container 27. The means for limiting the movement of the cup or receptacle 29 in this case are preferably arranged outside of the bottle or container 27, and comprise pins or pieces 30 fixed to the cup or receptacle 29 at 31 and constrained to move up and down in suitable guides 32 which are provided by a piece of appropriately shaped or bent metal 33, which encircles the bottle neck. This piece of metal 33 is, as shown, made in one piece, being bent to accommodate the pins or pieces 30 at four equi-distant positions 32 around the neck, and being shaped as indicated at 34 to assist in its being sprung over and around said bottle neck. Other means for limiting the movement of the cup or receptacle are easily devisable.

Means may also be provided in this type of the invention for holding the cup or receptacle up against the inverted cone-shaped end of the bottle neck when the device is not in use in order to prevent the ingress of dust or dirt to the liquid, or alternatively the bottle may be placed upright for this purpose.

What we claim as our invention, and desire to protect by Letters Patent is:—

1. Means of the kind described comprising a liquid container air-tight at all points except where the discharge aperture or member providing it is placed, an inverted cone-shaped member attached to said container below the lowest level of the liquid, a discharge passage through said inverted cone-shaped member and a cup or receptacle of corresponding shape to the aforesaid member arranged beneath and around the outlet orifice of said member.

2. Means of the kind described comprising a liquid container air-tight at all points except where the discharge aperture or member providing it is placed, an inverted cone-shaped member attached to said container below the lowest level of the liquid, a discharge passage through said inverted cone-shaped member and a cup or receptacle of corresponding shape to the aforesaid member suspended beneath and around the outlet orifice of said member, and a rod or spindle arranged within the discharge aperture and of considerably less diameter than the aforesaid passage which passes up through the passage and serves for supporting the cup or receptacle as set forth.

3. Means of the kind described comprising a liquid container air-tight at all points except where the discharge aperture or member providing it is placed, an inverted cone-shaped member attached to said container below the lowest level of the liquid, a discharge passage through said inverted cone-shaped member and a cup or receptacle of corresponding shape to the aforesaid member suspended beneath and around the outlet orifice of said member, and a rod or spindle arranged within the discharge aperture and of considerably less diameter than the aforesaid passage which passes up through the passage and serves for supporting the cup or receptacle and a bifurcated lifting lever which engages the cup or receptacle or projections thereon as set forth.

4. Means of the kind described comprising a liquid container air-tight at all points except where the discharge aperture or member providing it is placed, an inverted cone-shaped member attached to said container below the lowest level of the liquid, a discharge passage through said inverted cone-shaped member and a cup or receptacle of corresponding shape to the aforesaid member suspended beneath and around the outlet orifice of said member, and a rod or spindle arranged within the discharge aperture and of considerably less diameter than the aforesaid passage which passes up through the passage and serves for supporting the cup or receptacle, and a bifurcated lifting lever which engages the cup or receptacle or projections thereon, said bifurcated lever being formed with an extension which accommodates a pin which passes through the lever extension and the lever fulcrum bracket and so serves to lock the lever in the position it is in when the cup is lifted as set forth.

5. Means of the kind described comprising a liquid container, air-tight at all points except where the discharge aperture is placed, said container being of inverted cone-shape around the discharge passage and a correspondingly shaped cup or receptacle positioned around and beneath the outlet orifice, and adapted to receive a measured quantity of the liquid from the container and to discharge said liquid when lifted up to the container as set forth.

6. Means of the kind described comprising a liquid container, air-tight at all points except where the discharge aperture is placed, said container being of inverted cone-shape around the discharge passage and a correspondingly shaped cup or receptacle positioned around and beneath the outlet orifice, and adapted to receive a measured quantity of the liquid from the container and to discharge said liquid when lifted up to the container and means for suspending said cup or receptacle, said means comprising a plurality of pins or pieces attached to the cup or receptacle and passing through guides provided in a suitably shaped member which encircles the container.

In testimony whereof we have signed our names to this specification in the presence of two subscribing witnesses.

JOSHUA AARON LEWIN.
GEORGE PILCHER BARTLETT.

Witnesses:
W. U. MASTERSON,
R. H. DELAFIELD.